United States Patent [19]

Etzel et al.

[11] 4,210,530
[45] Jul. 1, 1980

[54] TREATMENT OF METAL PLATING WASTES WITH AN UNEXPANDED VERMICULITE CATION EXCHANGE COLUMN

[75] Inventors: James E. Etzel, Lafayette, Ind.; Vasiliki Keramida, Athens, Greece

[73] Assignee: Purdue Research Foundation, Lafayette, Ind.

[21] Appl. No.: 13,929

[22] Filed: Feb. 22, 1979

[51] Int. Cl.² ............................................. C02B 1/44
[52] U.S. Cl. ..................... 210/38 B; 210/71; 423/24; 423/100; 423/139; 252/378 R
[58] Field of Search .................. 210/24, 29, 38 B, 71, 210/63 R, DIG. 31; 252/378 R; 75/101 BE; 423/24, 100, 139

[56] References Cited

U.S. PATENT DOCUMENTS

| | | | |
|---|---|---|---|
| 3,382,034 | 5/1968 | Kraus | 23/50 |
| 3,617,567 | 11/1971 | Mathre | 210/DIG. 31 |
| 3,617,582 | 11/1971 | Lawes et al. | 210/DIG. 31 |
| 3,658,470 | 4/1972 | Zievers et al. | 23/145 |
| 3,758,415 | 9/1973 | Wada | 252/378 R |
| 4,100,065 | 7/1978 | Etzel | 210/38 B |

*Primary Examiner*—Charles N. Hart
*Assistant Examiner*—Ferris H. Lander
*Attorney, Agent, or Firm*—Biebel, French & Nauman

[57] ABSTRACT

Multivalent heavy metal ions are removed from metal plating waste streams by passing them through an unexpanded vermiculite cation exchange column. The column is effective to remove copper, zinc, and nickel ions and mixtures thereof. Where cyanide and cyanide-metal complexes are also present in the plating waste stream, the stream is pretreated to destroy the cyanide and cyanide complexes prior to passage through the ion exchange column.

11 Claims, No Drawings

TREATMENT OF METAL PLATING WASTES WITH AN UNEXPANDED VERMICULITE CATION EXCHANGE COLUMN

BACKGROUND OF THE INVENTION

This invention relates to a method for removing multivalent heavy metals and metal cyanide ions from metal plating waste effluents. More particularly, this invention relates to the use of unexpanded vermiculite in its native state in a cation exchange column for removal of such multivalent heavy metals and metal cyanide ions.

Metal plating is used to improve surface properties of metallic and nonmetallic products by coating a relatively thin, adherent layer of metal onto an object. Electroplating is the most common and important of the various metal plating processes. Metals commonly used in electroplating processes include nickel, copper, chromium, zinc, gold, silver, cadmium, and tin.

There are two basic types of metal plating baths used in electroplating processes. They are the simple salt (or "acid" bath) and the complex ion bath, with cyanide being the most commonly used complex ion. For example, copper can be plated from either an acid or an alkaline bath. If an acid bath is used, the following simplified explanation is typical of the plating process. Two electrodes are immersed in a copper sulfate solution and connected to a direct current electrical source. When current is applied, copper ions in solution migrate toward the negative electrode (cathode) which can be the article to be plated. The positive electrode (anode) is of copper and is the source of new copper ions in solution to replace those which are plated onto the article.

When an alkaline plating bath is used, cyanide is the anion in solution and forms a complex with the heavy metal ion to be plated. Commercial alkaline copper and zinc metal plating baths usually contain cyanide as the complexing ion; cadmium plating baths almost always use cyanide. Typical cyanide concentrations in such baths may range from 15,000 to 100,000 mg/l.

Waste water from metal plating operations amounts to several billion gallons per year in the United States alone. Buford and Mosselli, *Industrial Wastes*, Reinhold Publishing Corp. (1953), indicate that the major sources of these wastes are from drag-out losses carried into overflow rinses by the plated element or the rack holding the plated element, solution dumping of spent, spoiled, or obsolete solutions (rarely done unless remedial measures fail), and tank leakage losses. Although trace amounts of metals in water supplies are not harmful, their presence in greater concentrations has well known adverse and toxic effects on both plant and animal life. In addition, the cyanide ion alone and in combination with heavy metal ions is one of the most toxic of industrial wastes and is present in large quantities in many electroplating waste waters. As little as 0.05 mg/l of cyanide in water will kill many forms of aquatic life.

The United States Public Health Service has established drinking water standards setting the maximum acceptable concentration of such heavy metals and cyanide in water supplies. A more detailed and comprehensive listing of the toxic effects of plating wastes can be found in an Environmental Protection Agency publication entitled "Water Quality Criteria Data Book, Volume 3, Effects of Chemicals on Aquatic Life" (Pub. No. 18050 GNV 05/71). Accordingly, in view of the billions of gallons of plating wastes generated yearly, it can be seen that there is a need for an effective means to remove both the heavy metals and metal cyanide compounds from these plating wastes to avoid pollution of water supplies.

Of course, this is a recognized need, and many attempts have been made to treat such plating waste effluents. The methods used for removal of heavy metal ions have included dilution and discharge into sewers or streams; evaporation, dialysis and electrodialysis; reverse osmosis; and land disposal. However, the two most common methods of heavy metal ion removal are neutralization-precipitation and ion exchange coupled with neutralization-precipitation. With respect to the cyanide portion of the plating waste effluents, treatments have included alkaline chlorination, acidification with volatilization and recovery, biological treatment, complexing, dilution, electrolytic oxidation, thermal decomposition, ion exchange, ozonation, and peroxygen compound treatment. Alkaline chlorination is by far the most common method of cyanide removal used today.

If cyanide is present in the metal plating wastes, it is almost always found in a complex with heavy metal ions. Since it is next to impossible to remove the heavy metal ions from the waste stream without first destroying the cyanide complex, it can be seen that at least a two-step removal process is necessitated when cyanide ion is present.

However, most, if not all, of the prior processes suffer from shortcomings. When alkaline chlorination is used as the process to destroy the cyanide complex, high amounts of chloride ion become dissolved in the waste and residuals of unreacted chloride can be very toxic to aquatic life. Equipment to safely contain these corrosive and toxic chemicals is costly. The Kastone process (Kastone is a registered trademark of E. I. duPont de Nemours & Co.) utilizes hydrogen peroxide and formaldehyde to convert cyanide ion to the less toxic cyanate ion followed by acidification to hydrolyze the cyanate ion to ammonium ion and carbon dioxide. The heavy metals present in the treated stream of the Kastone process are precipitated usually as oxides or hydroxides. However, heavy metal flocs (hydroxides) are themselves difficult to remove from a waste stream since they are bound with and have approximately the same density as water. Separation of precipitated metal hydroxides is both cumbersome and expensive involving further addition of thickening and settling aids and treatment with sludge thickening and drying apparatus, vacuum filtration, and/or centrifugal dewatering.

Ion exchange has also been utilized to concentrate both cyanide-heavy metal complexes and heavy metal ions in plating waste effluents to facilitate their later removal or recovery. An important advantage of ion exchange treatment is the savings of water due to recirculation of treated water. However, past methods using ion exchange have also suffered shortcomings including the presence of impurities in the waste which are destructive to ion exchange resins, the presence of interfering ions, a limited loading capacity of ion exchange columns, and relatively high operating costs. Even after regeneration, the metal ion precipitated from the spent regenerant solution constitutes a sludge that is difficult to dispose of in an acceptable manner. A discussion of recent literature involving the use of ion exchange resins in removing heavy metal ions from metal plating wastes may be found in Etzel, U.S. Pat. No. 4,100,065 to which reference is made. As can be seen, the need still exists for an efficient, safe, and relatively inexpensive method of removing heavy metal and cyanide ions from plating wastes.

SUMMARY OF THE INVENTION

Multivalent heavy metal ions are removed from metal plating liquid wastes by contacting the wastes with an unexpanded vermiculite cation exchange material. The particular vermiculite material used has a particle size of about 0.0067 in. to about 0.0234 in. and a cation exchange capacity of from about 70 to about 80 milliequivalents per 100 grams of material. The cation exchange capacity of the vermiculite varies depending upon the particular multivalent metal ion present, being lowest for zinc and highest for nickel. The vermiculite also functions effectively to remove mixtures of heavy metal ions from waste streams.

Where cyanide is also present in the waste stream, it will almost always form complexes with the heavy metal ions in the waste. In order to free those heavy metal ions from the cyanide complexes and render them in ion exchangeable form for vermiculite treatment, they must first be pretreated to destroy the cyanide complexes. This can be accomplished in a number of different ways.

If a copper cyanide complex is present in the waste stream, the complex is destroyed by adjusting the pH of the stream to about 9.0 to 9.8 and adding hydrogen peroxide to the stream. A reaction time of about 30 minutes is sufficient to destroy the cyanide complex. The waste stream is then adjusted to a pH of about 2 to 3 to solubilize the now free copper ion, and the stream is then passed through an unexpanded cation exchange column where the copper ions are exchanged for non-polluting magnesium ions.

Zinc cyanide complexes may also be destroyed by hydrogen peroxide treatment at an alkaline pH. Alternatively, an excess amount of copper ions may be added directly to the waste stream where cyanide ions in the stream will preferentially complex with the copper ions and free the zinc ions. Zinc ions are then removed from the stream by passing it through a vermiculite cation exchange column. In an alternate embodiment, the zinc cyanide complex containing waste stream is passed through a vermiculite column which has previously been exhausted with copper. Again, the cyanide will preferentially complex with copper and copper ions on the column will exchange with zinc ions. The copper cyanide complex leaving the vermiculite column in both embodiments is then treated with hydrogen peroxide, as above, to destroy the cyanide complex, acidified, and then passed through a second vermiculite column for copper removal.

Accordingly, it is an object of this invention to provide a safe, efficient, and inexpensive method of removing multivalent heavy metal ions from metal plating waste streams through use of an ion exchange process with unexpanded vermiculite.

It is a further object of this invention to provide a safe, efficient, and inexpensive method of destroying heavy metal ion cyanide complexes in metal plating waste streams rendering the metal ions suitable for ion exchange with unexpanded vermiculite.

These and other objects and advantages of the invention will be apparent from the following description and the appended claims.

DESCRIPTION OF THE PREFERRED EMBODIMENTS

Clay minerals such as vermiculite have the property of being able to capture certain ions and retain them in an exchangeable state. Vermiculite has a structure consisting of two tetrahedral sheets composed of aluminosilicates and a central trioctahedral layer. These groups of mineral sheets are separated by layers of water molecules having magnesium ions associated therewith. These magnesium ions are largely exchangeable and their function is to satisfy charge deficiencies in the mineral layers.

The term cation exchange capacity (hereinafter "CEC") will be used to indicate the degree to which cations are exchanged and held by the vermiculite. CEC is normally defined as the sum of the exchangeable cations in a material. CEC is usually expressed in terms of milliequivalents of exchange capacity per 100 grams of material (meq/100 gm.) and is determined at a pH of 7. There are many methods available for determining the CEC of clay minerals, although most procedures consist of the same three basic steps:

1. The clay mineral sample is saturated with the chosen cation either by leaching or repeated washing and centrifuging.
2. The excess saturation solution is then removed from the clay by repeated washing with water or alcohol.
3. The absorbed cation is then displaced and the amount of displaced cation measured as the indication of exchangeable cation in the clay mineral sample.

It has been found that the CEC of several different sources of vermiculite varies widely. For example, vermiculite ore from Enoree, South Carolina exhibited a CEC of from 69 to 93 meq/100 gm. depending upon the particular cation exchanged. However, vermiculite ore from Libby, Montana, exhibited a much lower CEC of only about 35 meq/100 gm. Both of these ores were obtained from mines operated by W. R. Grace & Co. which sells vermiculite under the name Zonolite. Surprisingly, it was found that the South Carolina vermiculite in its native, unexpanded state exhibited a CEC and removal efficiency essentially equivalent to the exfoliated vermiculite from Transvaal, South Africa, reported in Etzel, U.S. Pat. No. 4,100,065. Work with South Africa vermiculite had indicated that controlled exfoliation was necessary to achieve a high CEC. However, the South Carolina vermiculite actually exhibited a higher CEC in its native, unexpanded state than when exfoliated. This is advantageous since the native material is much more dense than the exfoliated material. Thus, since CEC is based on weight, the native South Carolina vermiculite allows use of smaller ion exchange units for a given capacity.

It is not known exactly why the properties of South Carolina, Montana, and South Africa vermiculites vary so much. Such variances may be explained in part by the differences in composition between vermiculites of different origin. Thus, the primary constituents in the ores may be somewhat different and affect the ion exchange properties of the particular vermiculite.

While the usable particle sizes may vary, the smaller vermiculite particles have been found to be preferable for use in the cation exchange column. The reason for this is that the rate of ion exchange is increased with decreasing particle size, channelization and formation of air pockets in the column are minimized, and the smaller particles were more easily packed in a laboratory size column. Therefore, at least with respect to the laboratory scale experiments reported below, vermiculite particles of less than 10 mesh (approximately 1200$\mu$) are preferred. The general range of particle sizes utilized in testing was from about 175$\mu$ to about 595$\mu$. Of course, in commercial size column operation, a different optimum particle size may be found.

Other process parameters used depend on the type of multivalent heavy metal being removed, whether cyanide complexes are present or not, the concentration of ions in the effluent, and the amount of effluent being treated. However, on the laboratory scale operation used, the following optimums have been determined to exist:

1. Vermiculite Weight: 36 grams
2. Vermiculite bed height: 15 inches
3. Column surface: 0.11 in.$^2$
4. Bed volume: 34 ml (0.0012 ft$^3$)
5. Vermiculite particle size: 0.007 in.<Verm.$\leq$0.023 in.
6. Direction of flow: upflow
7. Hydraulic flow rates: 0.27 gal/min/ft$^2$ to 0.82 gal/min/ft$^2$
8. Hydraulic dentention time: 11.3 min. to 34 min.
9. Bed density: 66 lb/ft$^3$ Where copper cyanide complexes are present in the waste stream, it is necessary first to destroy the cyanide ions before the copper ions can be removed by the vermiculite column. This is accomplished by adding up to six moles of hydrogen peroxide to the waste stream per mole of cyanide ion present and allowing the reaction to proceed for about 30 minutes. Depending on the concentration of cyanide ion in the waste stream, more than six moles of hydrogen peroxide per mole of cyanide ion may have to be added. It has been found that lower concentrations of cyanide ion in the waste stream require proportionately greater amounts of hydrogen peroxide to completely destroy the cyanide ion. The use of larger quantities of hydrogen peroxide will reduce the time required for complete destruction of any cyanide ion present in the waste stream. The reaction should be carried out at a pH of from about 9.0 to 9.8. Use of pH values above 9.8 caused longer reaction times and resulted in significant quantities of unreacted cyanide ion remaining in the waste stream.

At this alkaline pH range, the reaction of hydrogen peroxide with cyanide ion results in the formation of oxides and hydroxides of the heavy metal in the waste stream. As discussed previously, these heavy metal flocs are very difficult to settle or separate out of suspension. Additionally, as long as they are in oxide or hydroxide form, they cannot be removed by passing through the vermiculite ion exchange column. Therefore, after the hydrogen peroxide-cyanide reaction has gone to completion, the pH of the waste stream should be adjusted to a pH of between 2 and 3 by addition of a strong acid such as hydrochloric or sulfuric to dissolve the heavy metal oxide and hydroxide precipitates and bring the metal ions back into solution. Acidifying the waste stream is also advantageous in that the acid will hydrolyze any cyanate ion (one of the products of the hydrogen peroxide-cyanide reaction) still present in the waste stream to carbon dioxide and ammonium ion.

After destruction of the cyanide ion, the stream containing copper ion in solution is treated by passing the stream through a column of unexpanded vermiculite particles. Using flow rates of less than about 1.0 gal/min/ft$^2$, the South Carolina particles will exhibit a CEC of from 69 to 76 meq/100 gm and achieve, at exhaustion stage, a copper removal from the waste stream of from 36 to 78 percent.

Where the waste stream contains zinc cyanide complexes, there are a number of alternative methods of destroying the cyanide complex and removing zinc ion from the stream. The cyanide complex may be destroyed by use of the Kastone process wherein the pH of the waste stream is adjusted to about 10.5–11.8. While heating to about 120°–130° F. with agitation, formaldehyde (37% solution) and hydrogen peroxide (41% solution) are added. The reaction is allowed to proceed for about 1 hour. About 15 ml of the hydrogen peroxide solution per 100 ppm cyanide in the waste stream is required for complete destruction of cyanide, although greater amounts may be utilized to assure a complete reaction. Cyanate ion, a by-product of the reaction, is then hydrolyzed to carbon dioxide and ammonium ion by acidifying the waste stream to a pH of 2–3 using a strong mineral acid such as sulfuric or hydrochloric. The free zinc ion in the waste stream is then removed by passing the stream through an unexpanded vermiculite column.

In an alternate embodiment, advantage may be taken of the greater stability of the copper cyanide complex over the zinc cyanide complex. The stability constant of the zinc cyanide complex, believed to be predominantly $Zn(CN)_3{}^-$, is $4.8\times10^{16}$. However, the stability constant for the copper cyanide complex, believed to be predominantly $Cu(CN)_4{}^{--}$, is about $1.0\times10^{26}$. Thus, if the zinc cyanide waste comes into contact with vermiculite particles having copper at the exchangeable sites, the copper held in the vermiculite lattice will interact with the cyanide. Since the copper cyanide complex is $10^{10}$ times more stable than that of zinc cyanide, a rearrangement will occur resulting in the copper ions leaving the vermiculite lattice to complex with cyanide and being replaced by zinc ions in the lattice. This may be accomplished by adjusting the pH of the waste stream to about 9.0, and passing the zinc cyanide containing stream through a first column of vermiculite particles which have previously been exhausted with copper. That is, in this first vermiculite column, substantially all of the exchangeable magnesium ion sites have been replaced with copper ions. This may be accomplished by subjecting a vermiculite column to a solution containing copper ions (e.g., a copper sulfate solution) until the exhaustion point of the column is reached; the stream may either be made-up especially for this purpose or may be a plating waste stream known to contain copper ions. Essentially all of the zinc in the plating waste stream will be exchanged by passing through the vermiculite particles containing copper with results of over 90 percent zinc removal efficiency. The now copper cyanide containing plating waste stream can be successfully treated as described above using hydrogen peroxide followed by acidification and, then, treatment in a second vermiculite column of the type described, whereby the copper ions are exchanged for nonpolluting magnesium ions. Depending on the relative concentrations of zinc and copper in the waste stream, or if the waste stream contains only zinc, a two column operation may be set up. As the second vermiculite column becomes exhausted with copper, it may replace the first column which by now has become exhausted with zinc. A fresh second column is then placed into operation and the procedure repeated.

In still a different embodiment, an excess of copper ions may be added directly to the zinc cyanide containing waste stream and the pH of the stream adjusted to about 9.0. The cyanide ion will preferentially complex with the copper ions and free the zinc ions for removal in an unexpanded vermiculite cation exchange column. The copper cyanide containing effluent stream can then be treated as described above to destroy the cyanide complex and remove copper ions from the stream.

Since all ion exchange columns have a finite capacity, at some point the exchangeable ions in a column will be exhausted. Even prior to exhaustion, a point is reached where the column is not as efficient as it initially was. This is termed the breakthrough point and may be experimentally determined by monitoring the output of the column (watching for an increase in heavy metal ion concentration) or by quantitatively preparing breakthrough-exhaustion curves for a given size column. Depending upon the type of operation utilized and the numer of vermiculite columns in series utilized, replacement of a column will be dictated by either the breakthrough or exhaustion point.

Once the exhaustion point of a column has been reached, the particles must either be regenerated or disposed of. Here is where use of vermiculite particles possess additional advantages over other ion exchange resins. Not only are the vermiculite particles quite inexpensive, so that replacement rather than regeneration is economically feasible, but they possess utility after ion exchange exhaustion. The exhausted particles may be exfoliated by placing them in a 700°–800° C. oven. The material produced has the same appearance, bulk, and structure of commercially sold vermiculite and may be used for the same packaging, insulation, aggregate, and soil conditioning purposes. Thus, there is not disposal problem for the exhausted particles once their utility for ion exchange has been exhausted. Of course, if desired, the exhausted particles may be regenerated by known procedures; however, in view of their inexpensive cost, replacement is the more economically attractive alternative at present.

EXAMPLE I

In this example, four different copper concentrations were tested using unexpanded South Carolina vermiculite particles. Flow rates of 1, 2, and 3 ml/min. were tested using a column with a bed depth of 15 in., a column surface of 0.11 in.$^2$, a bed volume of 34 ml, and a vermiculite weight of 36 gm. Vermiculite particle sizes ranged from 0.007 in. to 0.023 in. and direction of flow was up through the column.

Run 1 used a 25 mg/l copper ion concentration, Run 2, a 50 mg/l concentration, Runs 3–5, a 100 mg/l concentration, and Run 6 a 200 mg/l concentration, respectively. Cumulative totals of copper ion applied (mg) were kept, the effluent collected and tested, and the concentration of copper ion in the effluent (mg/l) was also recorded.

Copper determinations in the samples as well as in the feed solutions were performed using the Hach DC-DR (direct reading) Colorimeter, of the Hach Chemical Co., Ames, Iowa. The Bicinchoninate Method, with CuVer I Copper Reagent Powder Pillows was used, according to the manual provided by the company.

Using this cumulative data, breakthrough-exhaustion curves were prepared for each run. From the breakthrough-exhaustion curve, it is possible to estimate the quantity of ions removed. This is given in Table I below. Table I also shows the total copper applied to each column and the total column capacity at the exhaustion point. In addition, Table I gives the cation exchange capacities of the unexpanded vermiculites as they were determined for each run, based on the bed exhaustion data. It also shows the total percent copper removal obtained by each column.

Table I

| Run No. | Total Metal Applied (mg) | Column Values at Exhaustion Stage | | Vermiculite C.E.C. (meq/100 g) | Metal Removal % |
|---|---|---|---|---|---|
| | | Column Capacity (Total metal absorbed) | | | |
| | | (mg/column) | (meq/column) | | |
| | $Cu^{++}$ | | | | |
| 1 | 1115 | 869 | 27.4 | 76 | 78 |
| 2 | 1220 | 829 | 26.1 | 73 | 68 |
| 3 | 1400 | 820 | 25.8 | 72 | 59 |
| 4 | 1400 | 830 | 26.1 | 73 | 59 |
| 5 | 1400 | 833 | 26.2 | 73 | 60 |
| 6 | 2266 | 810 | 25.5 | 71 | 36 |

It should be noted that the arbitrarily chosen exhaustion value of 0.95 $C_x$, where $C_x$ was the inflow copper concentration, was not always reached due to pump difficulties; the exhaustion values obtained were in the range of 0.80 $C_x$ to 0.93 $C_x$. Therefore, some variation in the column capacity values can be attributed to the nonuniform exhaustion coefficient.

It can be seen from the data in Table I, that the CEC of the vermiculite was higher than the 70 meq/100 gm reported by the manufacturer. Two other observations may be made: (1) the exchange capacity increased very little, if any at all, as the metal concentration of the inflow to the vermiculite bed decreased, and (2) the exchange capacity was not affected by changes in flow rate. These results are opposite those indicated in Etzel, U.S. Pat. No. 4,100,065, which used exfoliated South Africa vermiculite.

Table II below gives the percent bed utilizations determined at the arbitrarily chosen breakthrough point of 0.1 mg/l. The percent bed utilization was calculated using the cumulative flow though the column, at 0.1 mg/l effluent metal concentration, and the following formula:

$$\% \text{ Bed Utilization} = \frac{\text{(Volume at 0.1 mg/l) (mg metal in feed)}}{\text{(Bed capacity (from Table I) in mg)}} \times 100$$

Table II

| | Column Values at Breakthrough Point (0.1 mg/l metal) | | | | |
|---|---|---|---|---|---|
| Run No. | Cumulative Volume (l) | Total metal applied (meq) | C.E.C. at Breakthrough (meq/100 g) | % Bed Utilization | Number of Bed Volumes |
| $Cu^{++}$ | | | | | |
| 1 | 19.100 | 15.04 | 42 | 55.0 | 562 |
| 2 | 8.000 | 12.60 | 35 | 48.3 | 235 |
| 3 | 1.850 | 5.83 | 16 | 22.6 | 54 |
| 4 | 2.540 | 8.00 | 22 | 30.6 | 75 |
| 5 | 2.780 | 8.76 | 24 | 33.4 | 82 |
| 6 | 0.850 | 5.35 | 15 | 21.0 | 25 |

As can be seen from the data, the CEC values, percent bed utilization, and the number of bed volumes greatly increased as the influent metal concentration was decreased, while the CEC values at column exhaustion did not show such a trend. These data also show that the unexpanded South Carolina vermiculite exhibited much higher working capacities at breakthrough than the South Africa vermiculite used by Etzel, U.S. Pat. No. 4,100,065.

EXAMPLE II

Utilizing the same column arrangement described in Example I, runs were made using zinc and nickel containing solutions to test the unexpanded vermiculite particles' ability to remove these ions from solution. Runs 7 and 8, using zinc, were made at 50 and 100 mg/l, respectively, and at a flow rate of 2 ml/min. Runs 9 and 10, using nickel, were also made at 50 and 100 mg/l, respectively, and at flow rates of 2 ml/min. The results are reported in Tables III and IV below.

Table III

| | Column Values at Exhaustion Stage | | | | |
|---|---|---|---|---|---|
| Run No. | Total Metal Applied (mg) | Column Capacity (total metal absorbed) mg/column | Column Capacity meq/column | Vermiculite CEC (meq/100 gm) | Metal Removal % |
| $Zn^{++}$ | | | | | |
| 7 | 1220 | 810 | 24.8 | 69 | 66 |
| 8 | 1400 | 808 | 24.7 | 69 | 58 |
| $Ni^{++}$ | | | | | |
| 9 | 1220 | 850 | 29.0 | 80 | 70 |
| 10 | 1400 | 840 | 28.6 | 80 | 60 |

Table IV

| | Column Values at Breakthrough Point (0.1 mg/l metal) | | | | |
|---|---|---|---|---|---|
| Run No. | Cumulative Volume | Total Metal Applied (meq) | C.E.C. at Breakthrough (meq/100 gm) | % Bed Utilization | Number of Bed Volumes |
| $Zn^{++}$ | | | | | |
| 7 | 6.680 | 10.22 | 28 | 41.2 | 197 |
| 8 | 2.240 | 6.85 | 19 | 27.7 | 66 |
| $Ni^{++}$ | | | | | |
| 9 | 7.750 | 13.20 | 36 | 45.6 | 228 |
| 10 | 2.400 | 8.18 | 23 | 28.6 | 71 |

As can be seen, CEC at both breakthrough and exhaustion compare favorably with the results reported for copper removal.

In order to test the removal efficiency of a column of unexpanded vermiculite on a mixture of heavy metal ions, a solution containing 5 mg/l each of copper, zinc, and nickel was passed through a column having the same operating parameters as the column in Example I. Results are reported in Table V below.

Table V

| Copper, Zinc, and Nickel Combined Metal Removal at Exhaustion Stage | | | |
|---|---|---|---|
| | Metal Applied (meq/100 gm) | Metal Removed (meq/100 gm.) | Removal Efficiency |
| Copper | 35.14 | 28.42 | 81% |
| Zinc | 34.17 | 26.47 | 78% |
| Nickel | 38.06 | 31.22 | 82% |

As can be seen, the South Carolina unexpanded vermiculite column operated at 78% to 82% efficiency in removing a combination of metal ions from solution at low metal concentrations. On a commercial scale, it is believed that plating wastes having even greater concentrations of multivalent heavy metal ions can be treated efficiently and effectively using an unexpanded vermiculite cation-exchange column.

EXAMPLE III

Two different copper cyanide solutions were tested in vermiculite columns having operating parameters as in Example I. Waste A was prepared having a copper concentration of 106 mg/l and a cyanide concentration of 183 mg/l. Waste B was prepared having a copper concentration of 53 mg/l and a cyanide concentration of 91.5 mg/l. The pH of the wastes was adjusted to about 9.8 and hydrogen peroxide (reagent grade; approximately 30% strength) was added to the wastes—3 ml per liter of Waste A and 2.2 ml per liter of Waste B. After 30 minutes, the wastes were acidified to a pH of between 2 and 3 by addition of sulfuric acid. The concentration of various ions in the wastes at that time was as follows:

| | Run No. | Copper (mg/l) | CN (mg/l) | $NH_4$ (mg/l) |
|---|---|---|---|---|
| Waste A | 13 | 106 | 0–0.1 | 100–120 |
| Waste B | 14 | 53 | 0–0.1 | 50–60 |

As can be seen, cyanide ion was essentially completely destroyed and appeared as ammonium ion. The wastes were then passed through unexpanded vermiculite columns to remove the copper ions still in solution. The results are reported in Tables VI and VII below.

Table VI

| | Column Values at Exhaustion Stage | | | | |
|---|---|---|---|---|---|
| Run No. | Total $Cu^{++}$ Applied (mg) | Column Capacity (Total $Cu^{++}$ absorbed) (mg/column) | Column Capacity (meq/column) | Vermiculite C.E.C. (meq/100 g) | % $Cu^{++}$ Removal |
| 13 | 1484 | 790 | 25 | 69 | 53 |
| 14 | 1272 | 792 | 25 | 69 | 62 |

Table VII

| | Column Values at Breakthrough Point (0.1 mg/l) | | | | |
|---|---|---|---|---|---|
| Run No. | Cumulative Volume (l) | Total $Cu^{++}$ Applied (meq) | C.E.C. at Breakthrough (meq/100 g) | % Bed Utilization | Number of Bed Volumes |
| 13 | 1.200 | 4.01 | 11 | 8.6 | 35 |
| 14 | 5.00 | 8.35 | 23 | 33.5 | 147 |

CEC values for the vermiculite in Table VI are lower than the corresponding CEC values reported for copper in Table I. The reason for this difference in value may have been due to the presence of other cations in the wastes. Looking at the CEC values at breakthrough reported in Table VII, it can be seen that competition between copper and other cations in the wastes had an effect which resulted in an earlier appearance of copper ion in the effluent than would be expected. Still, the percent bed utilization and number of bed volumes compares favorably with those reported for exfoliated South Africa Vermiculite by Etzel, Pat. No. 4,100,065.

EXAMPLE IV

Three vermiculite columns were treated with copper sulfate solution until exhaustion. Zinc cyanide waste, adjusted to pH 9.0 was then passed through these columns. The results are reported in Table VIII below.

Table VIII

| | | | | Column values at Run Termination Point | | | | |
|---|---|---|---|---|---|---|---|---|
| Run No. | $Zn^{++}$ Applied (mg/l) | $CN^-$ Applied (mg/l) | Total $Zn^{++}$ Applied (mg) | $Zn^{++}$ Column Capacity (Total $Zn^{++}$ absorbed) | | Vermiculite CEC-$Zn^{++}$ (meq/100 g) | Desorbed $Cu^{++}$ | |
| | | | | (mg/column) | (meq/column) | | (mg/column) | (meq/100/col) |
| 15 | 25 | 36.5 | 832 | 817 | 25.00 | 69.5 | 684 | 21.55 |
| 16 | 50 | 73.0 | 1130 | 990 | 30.20 | 84.0 | 534 | 16.80 |
| 17 | 100 | 146.0 | 1150 | 1100 | 33.66 | 93.5 | 580 | 18.27 |

As can be seen, essentially all of the zinc entering the column was retained. Total absorbed copper on each column prior to passing the zinc containing waste through was about 810–830 mg or about 25.5–26.1 meq. The percentage of the total absorbed copper that was desorbed by the zinc cyanide waste solution was 82, 65, and 72 percent for Runs 15, 16 and 17, respectively. Reported literature indicates that there is some tendency toward partial irreversibility of exchangeable ions in clay minerals at high multivalent ion occupancies.

As can be seen from the data, zinc continued to be removed from the bed even after copper stopped appearing in the column effluent. A possible explanation of this phenomenon is that even the irreversibly held copper on the vermiculite columns sufficiently interacted with cyanide to free the zinc ion from the complex. Analysis of the effluent cyanide showed that the amount of cyanide leaving the column was about 20 mg/l less than the cyanide in the feed.

Table IX below presents data for columns at the arbitrarily chosen breakthrough point of zinc concentration of 0.1 mg/l.

Table IX

| | Column Values at Breakthrough Point (0.1 mg/l) | | | |
|---|---|---|---|---|
| Run No. | Cumulative Volume (l) | Total $Zn^{++}$ Applied (meq) | CEC at Breakthrough (meq/100 g) | Number of Bed Volumes |
| 15 | 25.4 | 19.43 | 54 | 747 |
| 16 | 10.0 | 15.30 | 43 | 294 |
| 17 | 6.0 | 18.36 | 51 | 176 |

The CEC values of the unexpanded vermiculite for zinc were the highest capacities obtained during testing. The high values reflect the benefits of carrying out the cation exchange operation at a high pH (i.e., 9.0 or above). Effluents containing copper and cyanide from each of the runs were treated using the hydrogen peroxide process described above. This was followed by acidification and successful removal of copper by a second vermiculite column.

While the methods herein described constitute preferred embodiments of the invention, it is to be understood that the invention is not limited to these precise methods, and that changes may be made without departing from the scope of the invention, which is defined in the appended claims.

What is claimed is:

1. A method for removing multivalent heavy metal ions from metal plating waste effluents to avoid polluting the water supplies, comprising:
    passing an effluent containing ion-exchangeable heavy metal ions at a concentration of 200 mg/l or less through a cation exchange column packed with unexpanded vermiculite particles having a cation exchange capacity of at least about 69 meq/100 gm,
    whereby the ion-exchangeable multivalent heavy metal ions are exchanged for nonpolluting magnesium ions, the heavy metal ions are retained by the vermiculite lattice, and the treated effluent exiting from said column has a heavy metal ions concentration of 2 mg/l or less, and
    discharging from said column a treated waste effluent containing heavy metal ions at concentrations of 2 mg/l or less so as to prevent polluting the water supplies.
2. The method of claim 1 wherein said unexpanded vermiculite particles are less than approximately 10 mesh in size.
3. The method of claim 2 wherein said multivalent heavy metal ions are divalent and trivalent.
4. The method of claim 3 wherein said multivalent heavy metal ions are selected from the group consisting of copper, zinc and nickel.
5. The method of claim 1 wherein said unexpanded vermiculite is, after completion of the ion exchange process, removed from said column and heated to over 700° C. to expand it and produce a lightweight expanded vermiculite material.
6. The method of claim 1 wherein said waste effluent contains zinc cyanide ion complexes, and wherein zinc ions in said zinc cyanide ion complexes are rendered ion exchangeable by a pretreatment comprising the steps of:
    passing the zinc cyanide containing waste effluent through a column of vermiculite particles which have been exhausted with copper to yield an effluent containing copper cyanide ion complexes while said zinc ions are retained on said vermiculite column,
    adjusting the pH of the effluent from said column to about 9.0,
    adding hydrogen peroxide to said effluent to destroy the copper-cyanide ion complexes, and
    adjusting the pH of said effluent to about 2-3.
7. The method of claim 1 wherein said waste effluent contains zinc cyanide ion complexes, and wherein zinc ions in said zinc cyanide ion complexes are rendered ion exchangeable by a pretreatment comprising the steps of:
adjusting the pH of said effluent to about 10.5–11.8,
heating said effluent to about 120°–130° F.,
adding hydrogen peroxide and formaldehyde to said effluent to destroy the cyanide ion complexes, and
adjusting the pH of said effluent to about 2–3.

8. The method of claim 1 wherein said waste effluent additionally contains copper cyanide ion complexes, and wherein said copper cyanide ion complexes are rendered ion exchangeable by a pretreatment comprising the steps of:
adjusting the pH of said waste effluent to about 9.0,
adding hydrogen peroxide to said effluent to destroy the cyanide ion complexes, and
adjusting the pH of said effluent to about 2–3.

9. The method of claim 6 or 8 wherein hydrogen peroxide is added at a mole ratio of up to about 6 moles per mole of cyanide ion present in said effluent.

10. The method of claim 9 wherein said hydrogen peroxide is permitted to react with said cyanide ion complex for about 10–30 minutes prior to passing said effluent through said cation exchange column.

11. The method of claim 10 wherein said effluent is passed through said cation exchange column at about 1.0 gal/min/ft$^2$.

* * * * *